Nov. 19, 1957
E. F. SPENCER
2,813,609
CATHEAD CLUTCH ASSEMBLY
Filed Nov. 29, 1955
2 Sheets-Sheet 1
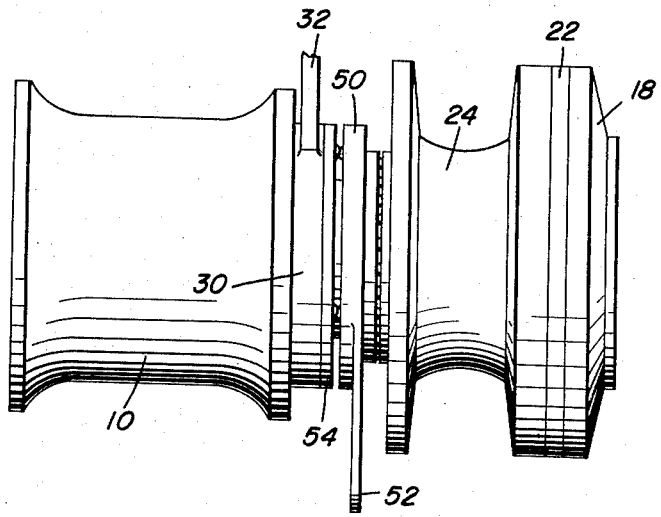
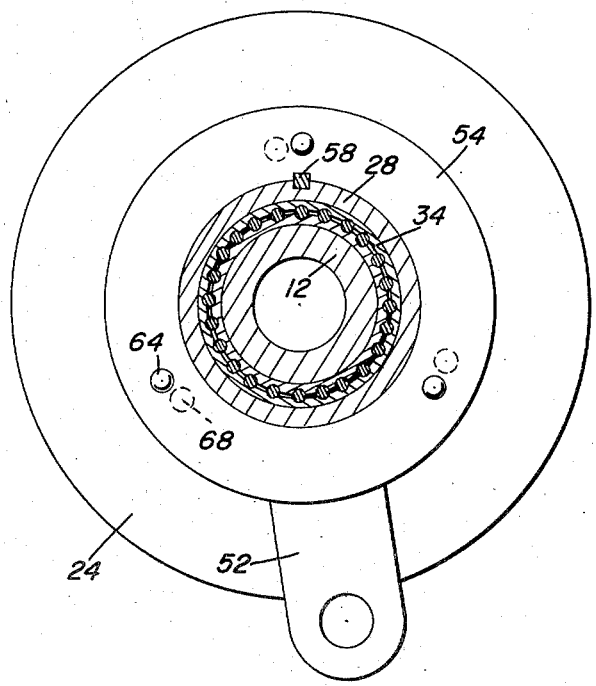
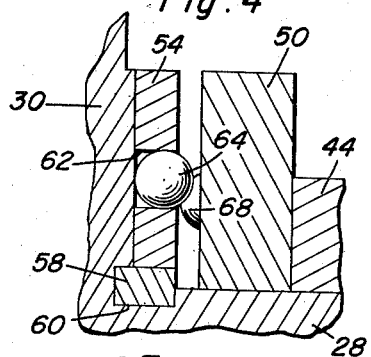
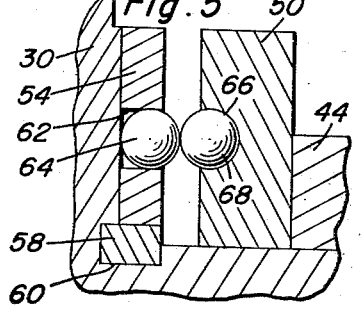
E Fred Spencer
INVENTOR.

Nov. 19, 1957  E. F. SPENCER  2,813,609
CATHEAD CLUTCH ASSEMBLY
Filed Nov. 29, 1955  2 Sheets-Sheet 2

E Fred Spencer
INVENTOR.

BY

United States Patent Office 2,813,609
Patented Nov. 19, 1957

2,813,609

CATHEAD CLUTCH ASSEMBLY

E Fred Spencer, Gladewater, Tex.

Application November 29, 1955, Serial No. 549,710

4 Claims. (Cl. 192—93)

This invention comprises novel and useful improvements in a cathead clutch assembly and more specifically pertains to a clutch mechanism for controlling the operation of catheads such as are employed in drilling rigs for operating tong chains and the like.

The principal object of this invention is to provide an improved cathead clutch assembly wherein the operation of the cathead drum from a continuously rotating mandrel connected with the draw works of a drilling rig may be effected with greater ease and with greater certainty.

A further object of the invention is to provide a cathead clutch assembly in accordance with the foregoing object wherein the clutch mechanism shall be greatly increased as to sensitivity of operation and wherein the wear thereof shall be reduced.

A further object of the invention is to provide a cathead clutch assembly in accordance with the foregoing objects wherein the life of the clutch assembly and of the associated cathead drum shall be greatly increased through the use of anti-friction bearings upon all rapidly moving surfaces thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of a portion of a cathead assembly showing the cathead clutch assembly in accordance with this invention applied thereto, the parts being illustrated in the clutch engaged position thereof;

Figure 3 is a vertical transverse sectional view taken substantially upon the plane indicated by section line 3—3 of Figure 2 and showing in full and dotted lines the relative positions of the clutch actuating elements of the assembly in clutch disengaged position;

Figures 4 and 5 are detailed sectional views taken upon an enlarged scale and showing respectively the clutch disengaged and the clutch engaged positions of the clutch actuating members.

Figure 2:
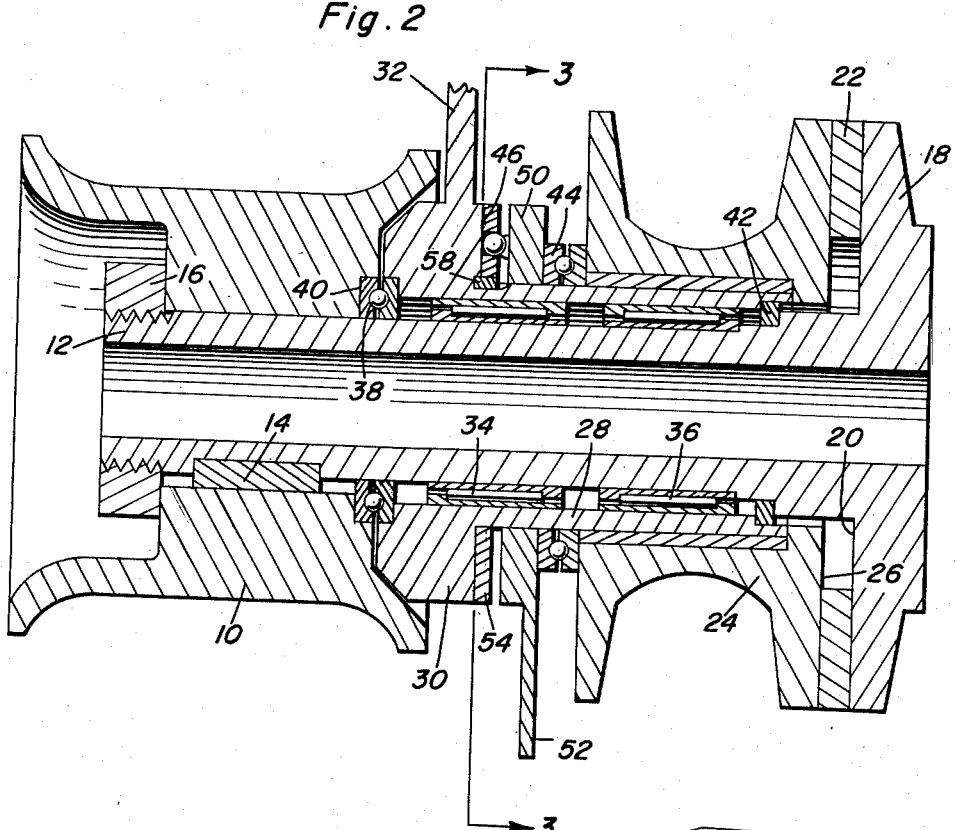
Figure 2 is a fragmentary view upon an enlarged scale of the arrangement of Figure 1 and showing in vertical longitudinal section structural details of the invention, the clutch assembly being shown in the clutch engaged position thereof.

In the accompanying drawings, with particular reference to Figures 1 and 2, the cathead assembly is shown as comprising a main winch drum 10 which is secured to a driving mandrel 12 as by a key 14 and a retaining nut 16 whereby the winch drum 10 will be rotated whenever the mandrel is in motion.

The mandrel may conveniently include means whereby the same is attachable to the draw works of a drilling rig, not shown, such as the flange 18. The latter includes an annular surface 20, upon which a friction lining 22 of any desired character is secured, the lining and surface constituting the driving clutch surface of the clutch assembly.

A cathead drum 24 encircles the mandrel and is freely rotatable thereon as set forth hereinafter, being provided upon one end with a clutch surface 26 which constitutes a driven clutch surface and cooperates with a driving clutch surface formed by the members 20 and 22.

There is provided a bushing or sleeve 28 which has a diametrically enlarged and axially thickened portion 30 at one end thereof, the latter being provided with an extension 32 by means of which the bushing may be secured to any stationary supporting framework. By means of the bushing, the cathead assembly is supported and is mounted for rotation in a manner to be subsequently set forth.

By means of suitable anti-friction bearing assemblies such as the needle bearing assemblies 34 and 36, positioned within the bushing, the mandrel is rotatably journaled therein. At its outer end there is provided an axial thrust bearing 38 which is mounted upon the mandrel and is suitably positioned between the enlarged end 30 of the bushing and a recessed seat 40 in the adjacent end of the main winch drum 10.

A suitable oil sealing or packing ring 42 of any desired character is operatively associated with the exterior surface of the mandrel and the inside surface of the bushing to prevent lubricant from passing therebetween into engagement with the driving and driven clutch surfaces.

The cathead drum 24 is freely and rotatably journaled upon the bushing and is rotatably and axially movable thereon. A thrust bearing assembly 44 is journaled upon the bushing and has one side thereof bearing against the cathead drum 24 for imparting axial movement thereto by means of an actuator construction to be now described.

The enlarged head 30 of the bushing is provided with an annular thrust surface 46. A clutch actuator assembly is operatively interposed between this thrust surface and the thrust bearing 44 for imparting axial movement to the cathead drum and thereby engaging the cooperating driving and driven clutch surfaces to operatively lock the cathead drum to the mandrel for rotation thereby; or to alternatively release these parts as desired.

Figure 6:
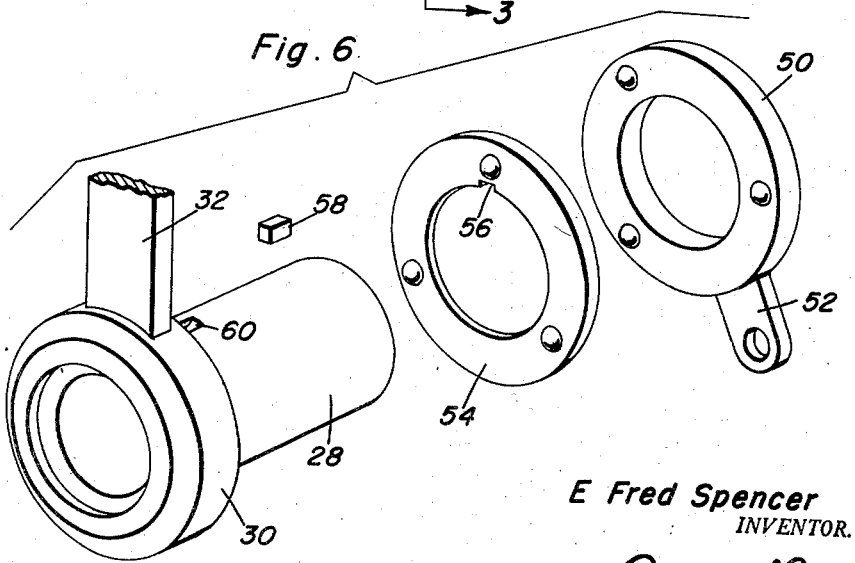
Figure 6 is a group perspective view of a bushing, and the fixed and movable members of the clutch actuating assembly, a part of the bushing support means being broken away.

Referring now particularly to Figure 6 together with Figures 4 and 5, it will be seen that the actuator assembly includes a movable member in the form of a ring 50 which is rotatably mounted upon the bushing 28 and is provided with an actuating lever arm or handle 52 and a stationary member in the form of an annular member or ring 54 which is also rotatably mounted upon the bushing and is fixedly secured as by means of a keyway 56 and a key 58 disposed in a key recess 60 in the bushing. It will be thus apparent that the annular member 54 bears against the thrust surface 46 of the bushing and is keyed to the bushing for fixed attachment thereto. The ring 50, on the other hand, is rotatable upon the bushing and is interposed between the annular member 54 and the thrust bearing 44.

Axial projections are provided upon the members 50 and 54 for cooperation with each other to impart axial movement to the member 50 relative to the member 54 and thus, in turn, through the thrust bearing 44 impart axial movement to the cathead drum 24 for causing engagement of the driving and driven surfaces. As will be best apparent from Figures 4 and 5, the annular member 54 is provided with circumferentially spaced axially extending bores or sockets 62 in which are received anti-friction balls 64. Any desired number of such sockets and balls may be provided, three being found to be sufficient for the purposes of this invention. The balls are so mounted in these sockets that they will protrude from that side of the annular member 54 which is adjacent to the ring 50. In some instances, the balls may extend entirely through the annular member so that the balls may bear and abut against the thrust surface 46. In other instances, the balls may be received in blind sockets or bores in the annular member 54. In any event, it will be evident that thrust imposed upon the axially projecting portions of the balls will be in turn delivered to the thrust surface 46.

The ring 50 is also provided with sockets 66 in which are seated a second set of balls 68 which project axially from the member 50 towards the annular member 54. Any desired number of this second set of balls may be provided, but it is preferred to form the same number of balls in both sets on both members. It will be noted that the two sets of balls are disposed at the same radial distance from the center of rotation of the ring 50 whereby upon turning movement of the ring, the balls will be oscillated or rotated about the axis of the mandrel and may be selectively disengaged as shown in Figure 4, or may be engaged with each other as shown in Figure 5. When engaged, the axial projections constituted by the two sets of balls will displace the member 50 toward the right as viewed in Figures 2, 4 and 5, and through the thrust bearing 44 will urge the cathead drum 24 toward the right to cause engagement of the driving and driven clutch surface, whereby the cathead drum will be locked to the continuously rotating mandrel. When, however, the ring member is circumferentially shifted so that the two sets of balls are disengaged, as shown in Figure 4, the pressure applied to the cathead drum will be released and therefore the driving and driven surfaces will be disengaged.

It will be observed that by this arrangement a very sensitive control is provided for engaging and disengaging the clutch of the cathead drum since obviously a very slight circumferential movement of the ring 50 is sufficient to actuate the clutch. In addition, the rolling action of the two sets of balls upon each other and upon the adjacent surfaces will reduce wear. Finally, the thrust bearing 44 will reduce wear between the actuator ring 50 and the cathead drum 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cathead clutch assembly comprising a stationary supporting bushing, a mandrel journaled therein and having means for attachment to a draw works for driving the mandrel, a driving clutch surface fixed relative to said mandrel, a cathead drum surrounding and journaled on said bushing for both rotary and axial motion, said drum having a driven clutch surface thereon for cooperative engagement with said driving surface, said bushing and said drum having opposed thrust surfaces, a clutch actuator mounted upon and surrounding said bushing and interposed between and operatively engaging said thrust surfaces, said actuator comprising stationary and movable rings operatively engaging said thrust surfaces, a set of axial cam members on each ring, said sets operable upon relative rotation of said rings, for causing engagement and for permitting disengagement for axial movement of said drum whereby to engage and release said clutch surfaces.

2. The combination of claim 1 wherein at least one of said rings has a plurality of recesses therein, the set of cam members of that ring comprising balls mounted in said recesses and projecting therefrom towards the other ring for actuation by the cam members of the latter.

3. The combination of claim 1 wherein said rings upon their adjacent surfaces have sets of recesses, each set of said cam members comprising balls mounted in a set of recesses and projecting toward the other ring for actuation by the set of cam members carried by the latter, at least one set of said cam members being rotatably journaled in its set of recesses.

4. The combination of claim 1 wherein at least one of said rings has a plurality of recesses therein, the set of cam members of that ring comprising balls mounted in said recesses and projecting therefrom towards the other ring for actuation by the cam members of the latter, a thrust bearing journaled on said bushing and interposed between and directly engaging the movable ring and the thrust surface on the drum.

References Cited in the file of this patent

UNITED STATES PATENTS

| | | |
|---|---|---|
| 1,147,377 | Corrall | July 20, 1915 |
| 1,840,682 | Sheldrick | Jan. 12, 1932 |
| 2,436,717 | Foster | Feb. 24, 1948 |
| 2,675,105 | Kelley | Apr. 13, 1954 |